United States Patent
Raghunath et al.

(10) Patent No.: US 10,674,413 B1
(45) Date of Patent: Jun. 2, 2020

(54) METHOD AND APPARATUS FOR MITIGATING ROAMING IMPACT ON COMMUNICATION SESSIONS

(71) Applicant: Zebra Technologies Corporation, Lincolnshire, IL (US)

(72) Inventors: Aparna Raghunath, Bangalore (IN); Dhanya Jalaja Ramachandran, Bangalore (IN)

(73) Assignee: Zebra Technologies Corporation, Lincolnshire, IL (US)

(*) Notice: Subject to any disclaimer, the term of this patent is extended or adjusted under 35 U.S.C. 154(b) by 0 days.

(21) Appl. No.: 16/216,740

(22) Filed: Dec. 11, 2018

(51) Int. Cl.
| | |
|---|---|
| *H04W 36/00* | (2009.01) |
| *H04W 36/02* | (2009.01) |
| *H04W 36/08* | (2009.01) |
| *H04W 36/26* | (2009.01) |
| *H04W 36/30* | (2009.01) |
| *H04W 48/16* | (2009.01) |
| *H04W 52/02* | (2009.01) |
| *H04W 36/18* | (2009.01) |

(52) U.S. Cl.
CPC . *H04W 36/0094* (2013.01); *H04W 36/00837* (2018.08); *H04W 36/023* (2013.01); *H04W 36/08* (2013.01); *H04W 36/18* (2013.01); *H04W 36/26* (2013.01); *H04W 36/30* (2013.01); *H04W 48/16* (2013.01); *H04W 52/0216* (2013.01)

(58) Field of Classification Search
CPC ....... H04W 36/0094; H04W 36/00837; H04W 36/023; H04W 36/08; H04W 36/18; H04W 36/26; H04W 36/30; H04W 48/16; H04W 52/0216
See application file for complete search history.

(56) References Cited

U.S. PATENT DOCUMENTS

| | | | |
|---|---|---|---|
| 8,532,059 B2* | 9/2013 | George | H04W 36/14 370/331 |
| 2005/0213534 A1* | 9/2005 | Benveniste | H04W 48/08 370/328 |
| 2010/0157162 A1* | 6/2010 | Oshikiri | H04N 5/145 348/699 |
| 2015/0098392 A1* | 4/2015 | Homchaudhuri | H04W 48/20 370/329 |
| 2019/0230587 A1* | 7/2019 | Gilson | H04W 36/0069 |

\* cited by examiner

*Primary Examiner* — Duc C Ho

(57) ABSTRACT

A method in a client device of mitigating roaming impact on communications includes: establishing a communication session at the client device via a first access point; responsive to determining that a roaming criterion is satisfied, transmitting a standby indicator to the first access point and detecting a second access point; prior to initiating a roaming process to transfer the communication session from the first access point to the second access point, determining whether a time period elapsed since receipt of a most recent beacon at the client device from the first access point exceeds a beacon threshold; and responsive to determining that the time period exceeds the beacon threshold: transmitting an active indicator to the first access point; receiving a further beacon from the access point; and responsive to receiving the further beacon, initiating the roaming process to transfer the communication session to the second access point.

20 Claims, 7 Drawing Sheets

US 10,674,413 B1

METHOD AND APPARATUS FOR MITIGATING ROAMING IMPACT ON COMMUNICATION SESSIONS

BACKGROUND

Wireless networks may be implemented with a plurality of access points, between which client devices of the networks may roam to maintain connectivity. Roaming from one access point to another at a client device may cause interruptions in ongoing communications at the client device. In the case of real-time applications such as voice calls, such interruptions may degrade call quality.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
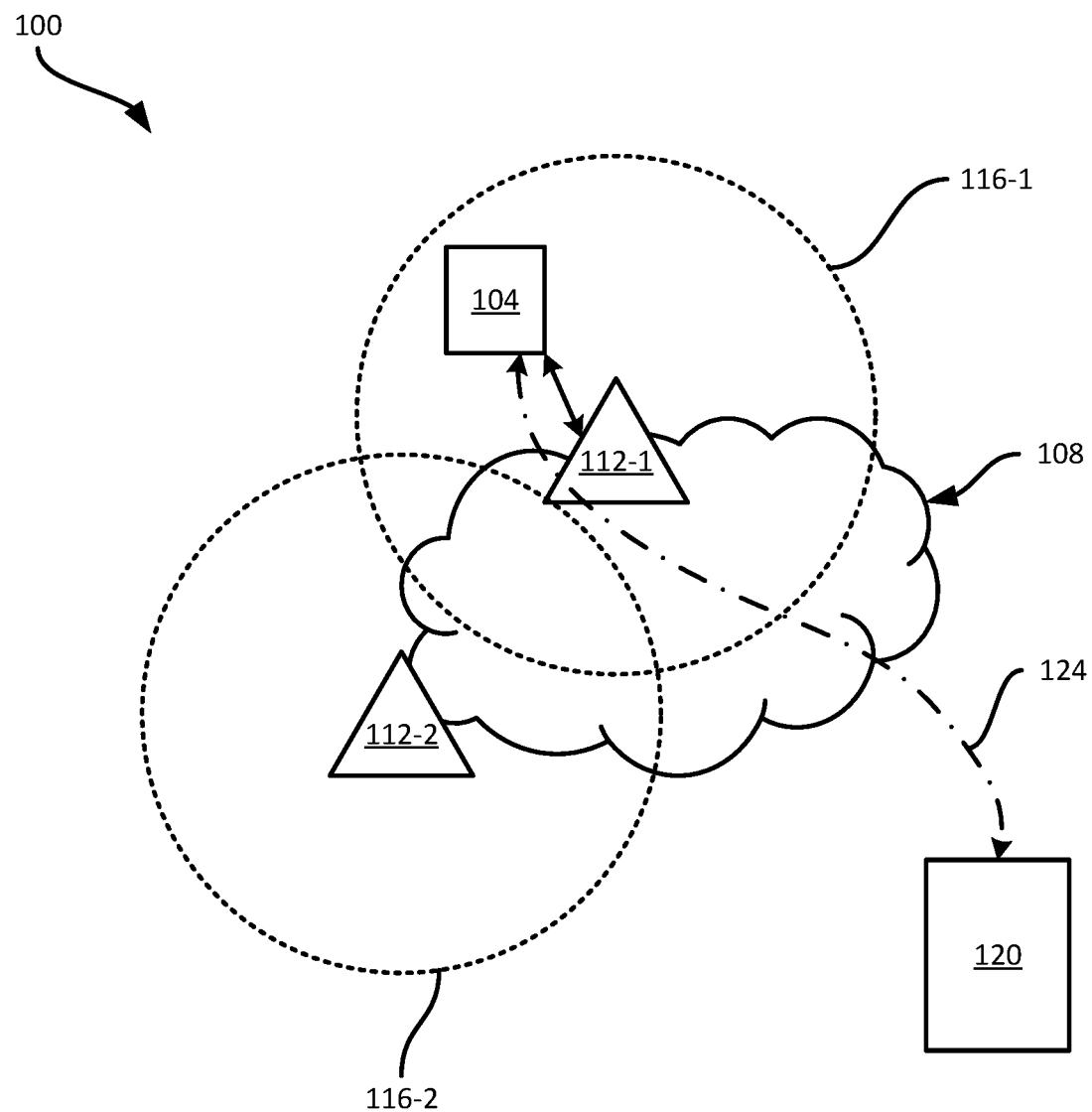
FIG. 1 is a block diagram of a communication system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method in a client device of mitigating roaming impact on communications, the method comprising: establishing a communication session at the client device via a first access point; responsive to determining that a roaming criterion is satisfied, transmitting a standby indicator to the first access point and detecting a second access point; prior to initiating a roaming process to transfer the communication session from the first access point to the second access point, determining whether a time period elapsed since receipt of a most recent beacon at the client device from the first access point exceeds a beacon threshold; and responsive to determining that the time period exceeds the beacon threshold: transmitting an active indicator to the first access point; receiving a further beacon from the access point; and responsive to receiving the further beacon, initiating the roaming process to transfer the communication session from the first access point to the second access point.

Additional examples disclosed herein are directed to a client device, comprising a communication interface; and a processor connected to the communication interface, the processor configured to control the communication interface to establish a communication session via a first access point; the processor further configured, responsive to a determination that a roaming criterion is satisfied, to transmit a standby indicator via the communication interface to the first access point, and to detect a second access point; the processor further configured, prior to initiation of a roaming process to transfer the communication session from the first access point to the second access point, to determine whether a time period elapsed since receipt of a most recent beacon at the client device from the first access point exceeds a beacon threshold; and the processor further configured, responsive to a determination that the time period exceeds the beacon threshold, to: transmit an active indicator to the first access point; receive a further beacon from the access point; and responsive to receipt of the further beacon, initiate the roaming process to transfer the communication session from the first access point to the second access point.

FIG. 1 depicts a communication system 100 including a wireless client computing device 104 (also referred to herein as the client device 104), such as a smartphone, laptop computer, tablet computer or the like. The system 100 also includes a wireless network 108. The network 108, in the present example, is a wireless local area network (WLAN) based on the IEEE 802.11 family of standards (i.e. a WiFi network). In other examples, the network 108 can be based on other suitable networking technologies. The network 108 is implemented by one or more access points, of which two examples 112-1 and 112-2 are shown, each providing an area of coverage 116-1, 116-2 within which the device 104 may establish wireless connections with the access points 112.

Connecting to the network 108 enables the client device 104 to communicate with other computing devices, such as a remote client device 120. The client device 120 may be connected directly to the network 108 via one of the access points 112, or can be connected to the network 108 via one or more additional networks, including any suitable combination of other WLANs and wide-area networks (WANs), including the Internet.

The client device 104 is configured to establish communication sessions with the remote client device 120 via the network 108. An example communication session 124 is shown in the form of a voice over internet protocol (VoIP) call between the client devices 104 and 120. Various other examples will also now occur to those skilled in the art, including video calls and the like. In general, the communication session referred to herein is a substantially real-time communication session.

As will be understood by those skilled in the art, the client device 104 can be configured to roam between the access points 112-1 and 112-2 of the network 108 to maintain connectivity, e.g. during physical movements of the device 104 throughout a room, facility, or the like. When the device 104 roams, for example from the access point 112-1 to the access point 112-2, the communication session 124 is transferred from the access point 112-1 to the access point 112-2, permitting the session 124 to continue.

As will be discussed in greater detail below, the client device 104 is configured to perform certain actions to mitigate data loss, and the associated degradation in quality of the session 124 (e.g. audio jitter and the like during a VoIP call), during the above-mentioned roaming procedure.

Figure 2:
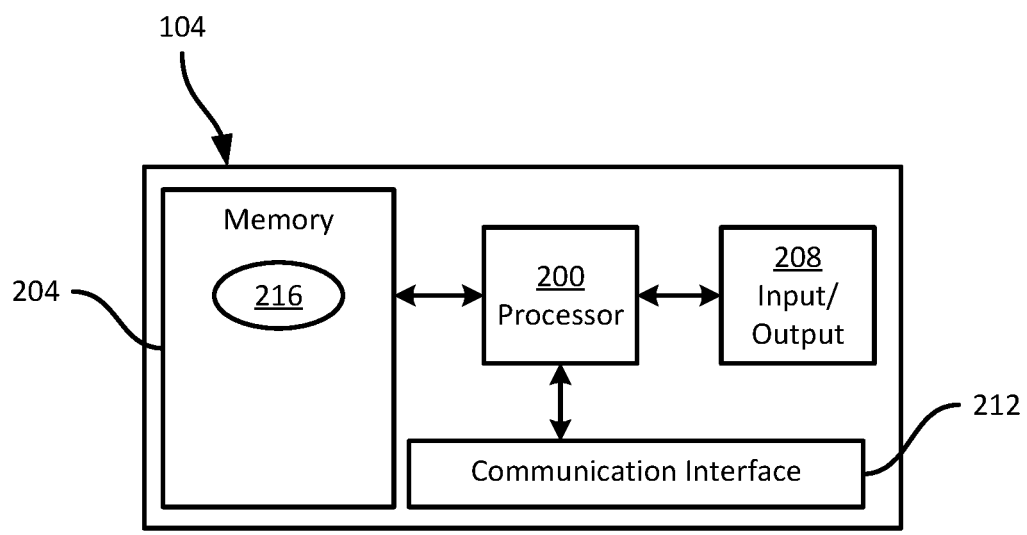
FIG. 2 is a block diagram of certain internal components of a client device in the system of FIG. 1.

Turning to FIG. 2, certain internal components of client device 104 are illustrated. The client device 104 includes a central processing unit (CPU), also referred to as a processor 200, interconnected with a non-transitory computer readable storage medium, such as a memory 204. The memory 204 includes any suitable combination of volatile (e.g. Random Access Memory (RAM)) and non-volatile (e.g. read only memory (ROM), Electrically Erasable Programmable Read Only Memory (EEPROM), flash) memory. The processor 200 and the memory 204 each comprise one or more integrated circuits (ICs).

The client device 104 also includes at least one input device, and at least one output device, illustrated in FIG. 2 as an input/output assembly 208 interconnected with the processor 200. The input device includes any suitable one, or any suitable combination of, a microphone, a camera, a touch screen, a keypad, a trigger (e.g. to initiate the performance of any encoding task), and the like. For example, the input device can include a microphone for capturing audio at the client device 104 for transmission to the remote device 120 during the session 124.

The output device includes any suitable one, or any suitable combination of a display (e.g., integrated with the above-mentioned touch screen), a speaker, and the like. The input/output device 208 is configured to receive input and provide data representative of the received input to the processor 200, and to receive output from the processor 200 and present the output, e.g. via the emission of sound from the speaker, the rendering of visual indications on the display, and the like.

The device 104 also includes a communication interface 212, enabling the device 104 to exchange data with other computing devices, including the access points 112 and (via the access points 112) the remote device 120. The communication interface 212 includes any suitable hardware (e.g. transmitters, receivers, network interface controllers and the like) and associated firmware, software and the like allowing the client device 104 to communicate, e.g. over the network 108.

The components of the device 104 are interconnected by communication buses, and powered by a battery or other power source, over the above-mentioned communication buses or by distinct power buses.

The memory 204 of the client device 104 stores a plurality of applications, each including a plurality of computer readable instructions executable by the processor 200. The execution of the above-mentioned instructions by the processor 200 causes the device 104 to implement certain functionality, as discussed herein. The applications are therefore said to be configured to perform that functionality in the discussion below. In the present example, the memory 204 of the client device 104 stores a communication control application 216, also referred to herein as the application 216. The device 104 is configured, via execution of the application 216 by the processor 200, to manage connections between the communication interface 212 and the access points 112. For example, execution of the application 216 can enable the client device 104 to initiate the above-mentioned roaming process, as well as the functionality to be discussed herein for mitigating the impact of the roaming process on the quality of the session 124.

In other examples, the processor 200, as configured by the execution of the application 216, is implemented as one or more specifically-configured hardware elements, such as field-programmable gate arrays (FPGAs) and/or application-specific integrated circuits (ASICs). The functionality implemented via the application 216 can also be implemented partially or entirely within the communication interface 212, e.g. by a microcontroller component of the communication interface 212. More generally, the functionality described herein in connection with the application 216 is implemented by a communication controller, which can be implemented as any one of, or any suitable combination of, the processor 200, the communication interface 212, and specifically-configured hardware elements.

Figure 3:
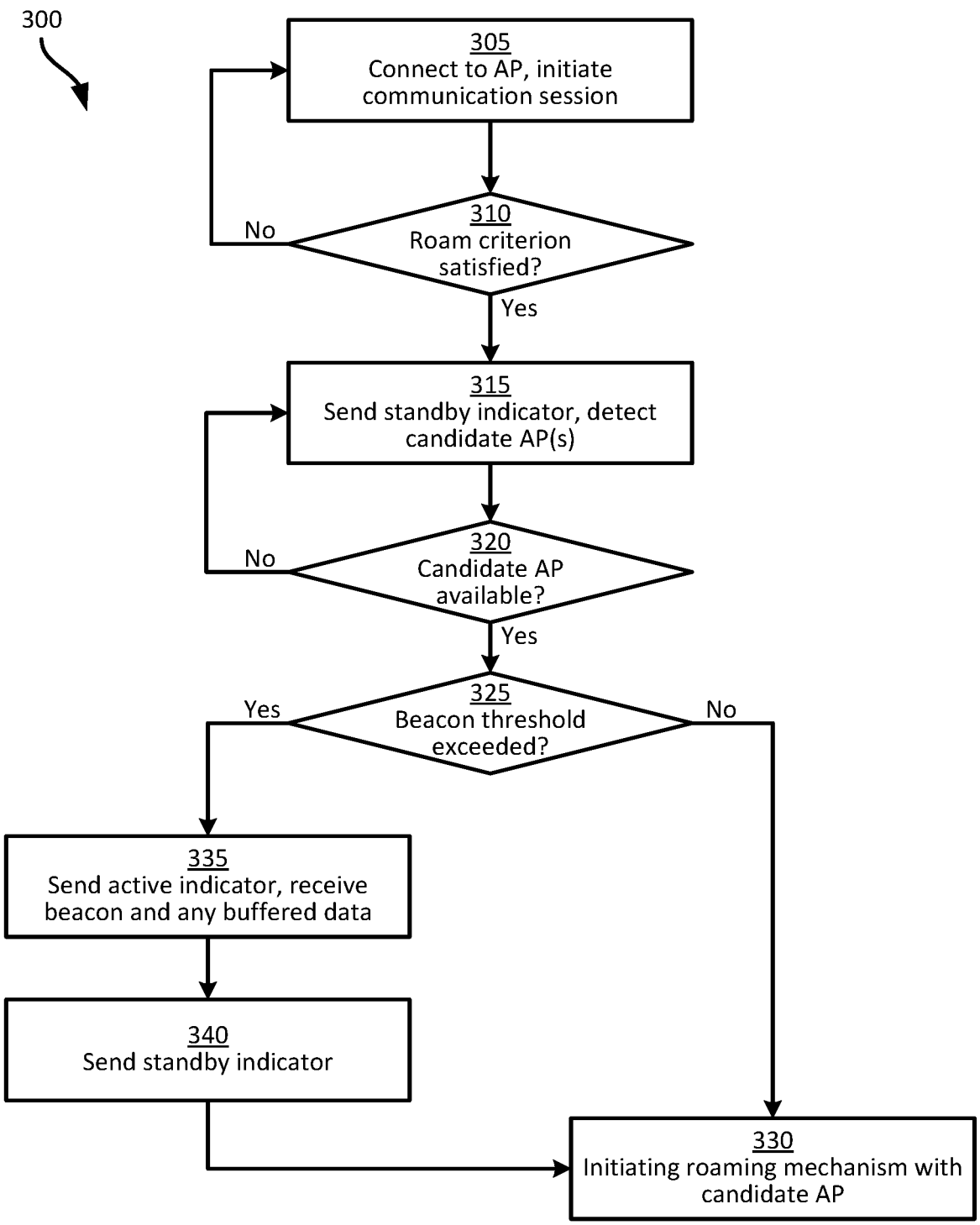
FIG. 3 is a flowchart of a method for mitigating roaming impact on communication sessions in the system of FIG. 1.

Turning now to FIG. 3, a method 300 of mitigating roaming impact on communication sessions is illustrated. The method 300 will be described in conjunction with its performance on the system 100. More specifically, the method 300 as described below is performed by the device 104, with reference to the components illustrated in FIG. 2.

At block 305, the client device 104 is configured to establish a connection with an access point 112, and to initiate a communication session via the access point 112. Various mechanisms will occur to those skilled in the art for connecting to access points and initiating communication sessions. The result of the performance of block 305 is illustrated in FIG. 1, in which the client device 104 has established a connection to the access point 112-1 and initiated the communication session 124.

At block 310, the client device 104 is configured to determine whether a roaming criterion has been satisfied. The roaming criterion defines one or more conditions indicating that the connection between the client device 104 and the access point 112 to which the client device 104 is currently connected (the access point 112-1, in the present example) is of sufficiently low quality that connecting to a different access point 112 may be necessary.

For example, the roaming criterion can be satisfied when the received signal strength indicator (RSSI) associated with the access point 112-1 at the client device 104 falls below a predefined threshold (e.g. −65 dBm). When the determination at block 310 is negative (e.g. when the RSSI associated with the access point 112-1 remains above the threshold), the communication session 124 continues via the access point 112-1, at block 305. The client device 104 can be configured to assess the roam criterion at block 310 at any suitable interval (e.g. with each received packet).

As will be understood by those skilled in the art, the access points 112 transmit beacon frames periodically (e.g. every 100 milliseconds), containing information employed by client devices for connecting to the access points, selecting time periods during which to transmit data, and the like. The beacon frames may also include an indication of whether the access point 112 has buffered data packets for delivery to a client device connected to the access point 112. For example, the indication may be implemented as a traffic indication map (TIM). The TIM is a bitmap in which each bit corresponds to a particular client device currently connected to the access point 112, and the value of the bit indicates whether or not packets are buffered at the access point 112 for retrieval by the client device.

Packets may be buffered at the access points 112 for various reasons, including a client device signaling to the access point 112 that it is entering a standby, or power-save, mode. When a client device detects, in a beacon from the access point 112 to which it is connected, an indication that the access point 112 has buffered data for the client device, the client device is configured to request the buffered data, following which the access point 112 is configured to transmit any buffered packets. Thus, in the present example performance of the method 300, the client device 104 is configured to periodically receive a beacon transmitted by the access point 112-1. When the beacon indicates that data addressed to the client device 104 is buffered at the access point 112-1, the client device 104 is configured to request the buffered data from the access point 112-1.

Figure 4:
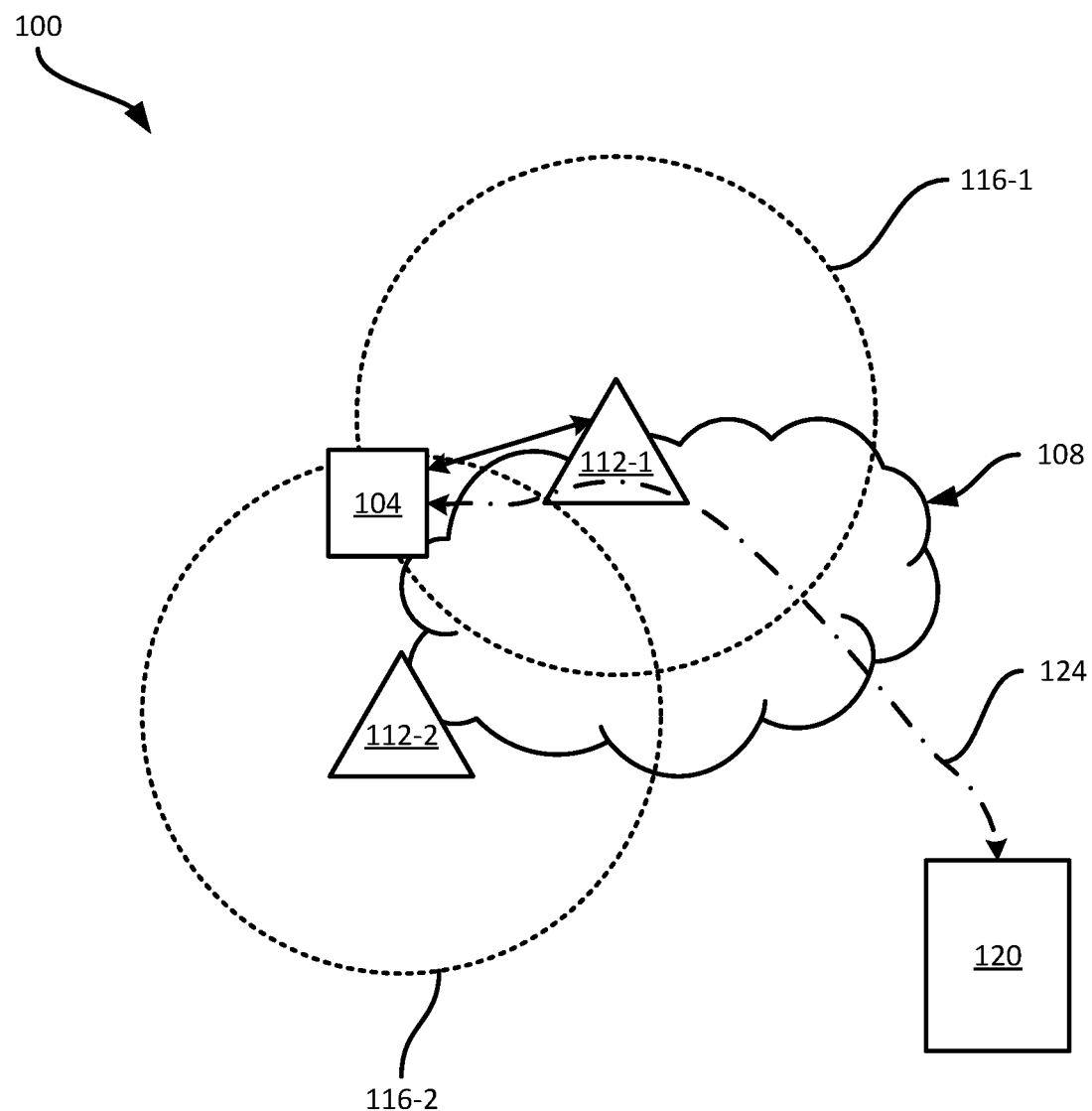
FIG. 4 is a block diagram of the system of FIG. 1 following a movement of the client device.

When the determination at block 310 is affirmative (i.e. when the roaming criterion is satisfied) the client device 104 is configured to proceed to block 315. Turning to FIG. 4, the system 100 is illustrated following a movement of the client device 104 towards the perimeter of the coverage area 116-1 of the access point 112-1. Although the client device 104 remains connected to the access point 112-1 and the session 124 is therefore still carried via the access point 112-1, the signal strength of the access point 112-1 as detected by the client device 104 is assumed to have fallen below a predetermined roaming threshold (e.g. −65 dBm). The determination at block 310 is therefore affirmative, and the client device 104 is configured to prepare to roam to another access point.

Returning to FIG. 3, at block 315 the client device 104 is configured to send a standby indicator to the access point 112-1 (i.e. the access point 112 to which the client device 104 is currently connected). The standby indicator indicates to the access point 112-1 that the client device 104 will be unable to receive data, and the access point 112—is therefore configured to buffer any data addressed to the client device 104 for later delivery. The standby indicator can be, for example, a QoS-Null frame containing a power state flag indicating that the client device 104 is entering a power-saving mode and will be unable to receive data.

The client device 104 is further configured, following transmission of the standby indicator, to detect one or more candidate access points 112 to which the client device 104 may roam. Various mechanisms are available for the detection of roam candidates. Examples of such mechanisms include an active scan, in which the client device 104 is configured to transmit probe requests on various channels, and to receive probe responses from any available access points 112 on those channels. Other mechanisms for detecting roam candidates, including passive scanning, will also now be apparent to those skilled in the art.

Figure 5:
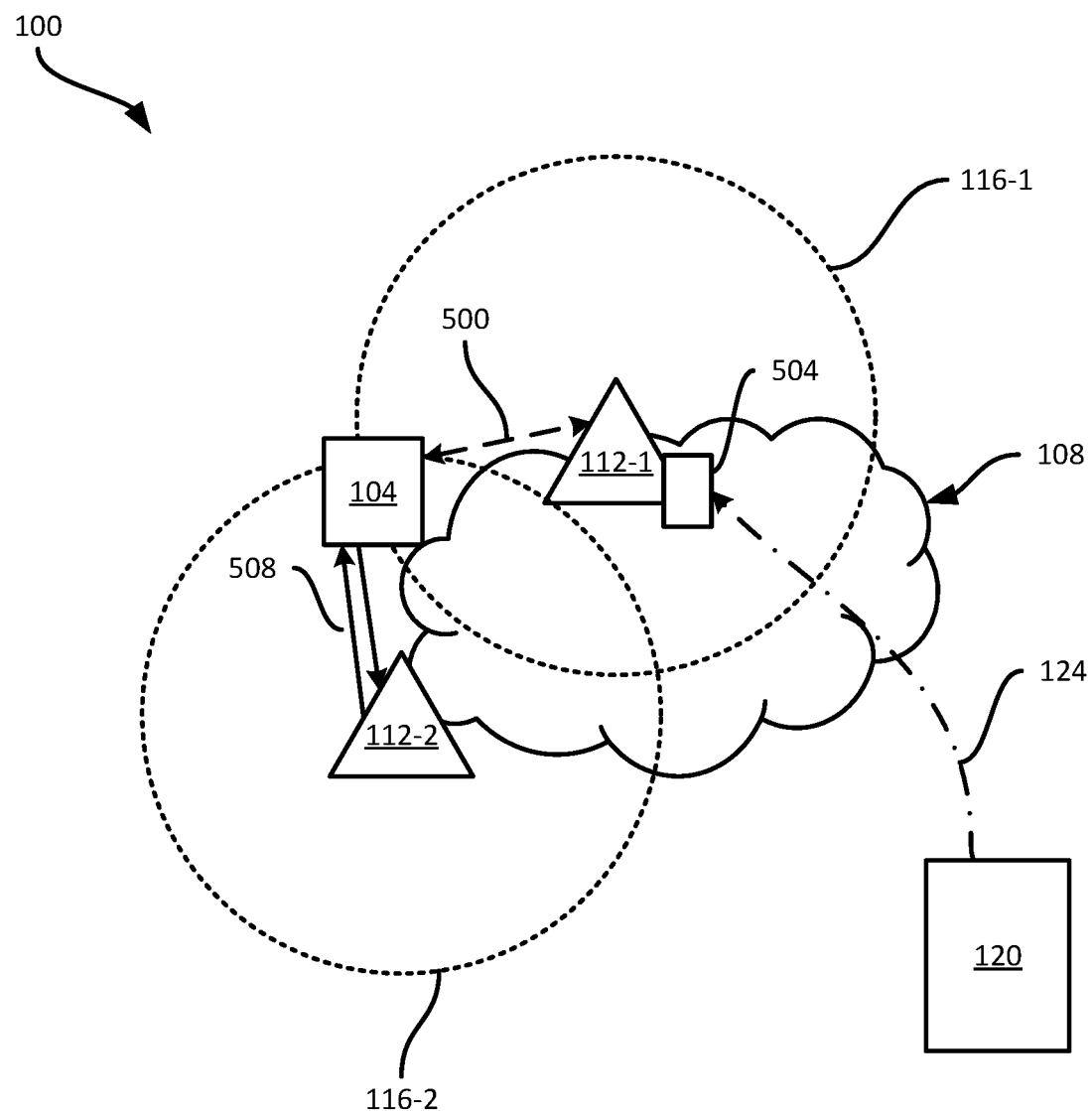
FIG. 5 is a block diagram of the system of FIG. 1 during the performance of block 315 of the method of FIG. 3.

Turning to FIG. 5, the system 100 is shown during the performance of block 315 by the client device 104. In particular, the link 500 between the client device 104 and the access point 112-1 is shown in dashed lines, indicating that the link 500 is currently on standby. That is, no data is being delivered from the access point 112-1 to the client device 104, because the client device 104 is engaged in the detection of roam candidates and the communication interface 212 may therefore be tuned to another channel than the channel over which the link 500 operates. As a result, data received at the access point 112-1 from the remote device 120 (e.g. packets of voice data for the session 124) is stored at the access point 112-1 in a buffer 504. Meanwhile, the client device 104 to exchange a probe request and response 508 with the access point 112-2 to assess the availability of the access point 112-2, the signal strength associated with the access point 112-2, and the like. For example, the probe request and response 508 may indicate a signal strength of −55 dBm associated with the access point 112-2 for the current physical position of the client device 104.

Returning to FIG. 3, at block 320, the client device 104 is configured to determine whether the detection process at block 315 yielded a candidate access point 112 suitable for roaming to. When the determination at block 320 is negative, the client device 104 can be configured to continue searching for roam candidates at block 315. In other examples, the client device 104 can be configured to return to block 305. When the determination at block 320 is affirmative, the client device 104 is configured to proceed to block 325. As noted above, in the present example performance of the method 300, the access point 112-2 is available for connection and the signal strength associated with the access point 112-2 as detected by the client device 104 is greater than the signal strength associated with the access point 112-1. The determination at block 320 is therefore affirmative.

At block 325, prior to initiating a roaming procedure to transfer the session 124 from the access point 112-1 to the access point 112-2, the client device 104 is configured to determine whether a period of time elapsed since receipt of the most recent beacon from the access point 112-1 exceeds a predefined beacon threshold. Each beacon transmitted by the access points 112 includes a timestamp, and the client device 104 can therefore compare the timestamp associated with the most recently received beacon from the access point 112-1 with a current time to determine the time elapsed since receipt of the most recent beacon.

The beacon threshold can be stored in the memory 204, e.g. as a parameter defined in the application 216. The beacon threshold is selected as a time period smaller than the expected time period required to complete a roaming process to the candidate access point 112 (the access point 112-2, in the present example). In other words, if the roaming process is expected to require at least 40 ms to complete (e.g. in a WiFi network, the time period elapsed between initiation of a roaming process and completion of the roaming process is typically between about 40 and about 100 ms), then the beacon threshold may be set at 40 ms.

When the determination at block 325 is negative, the client device 104 proceeds to block 330. For example, if the beacon threshold is 40 ms and the most recent beacon was received at the client device 104 from the access point 112-1 only 20 ms before the performance of block 325, the determination at block 325 is negative. In particular, the expected time required to initiate and complete the roaming process is likely to be smaller than the time until the next beacon from the access point 112-1 (e.g. about 80 ms). At block 330, the client device 330 initiates the roaming process with the access point 112-2, e.g. by sending an association request to the access point 112-2.

When the determination at block 325 is affirmative, the client device 104 instead proceeds to block 335. That is, when the time elapsed since receipt of the most recent beacon from the access point 112-1 indicates that next beacon from the access point 112-2 is likely to arrive before completion of a roaming process to the access point 112-2, the client device 104 is configured to perform additional actions before initiating the roaming process.

In particular, the client device 104 is configured, at block 335, to send an active indicator to the access point 112-1. While the standby indicator mentioned earlier signals to the access point 112-1 that the client device 104 will be unable to receive transmissions, the active indicator signals to the access point 112-1 that the client device 104 is again able to receive transmissions. The active indicator may be, for example, a Qos-Null frame containing a power state flag indicating that the client device 104 is no longer in a power-saving mode. Following transmission of the active indicator, the client device 104 is configured to await the next beacon from the access point 112-1. Responsive to receiving the next beacon from the access point 112-1, the client device 104 is configured to determine, e.g. based on the TIM data in the beacon, whether buffered data is available at the access point 112-1 and to retrieve such buffered data.

Figure 6:
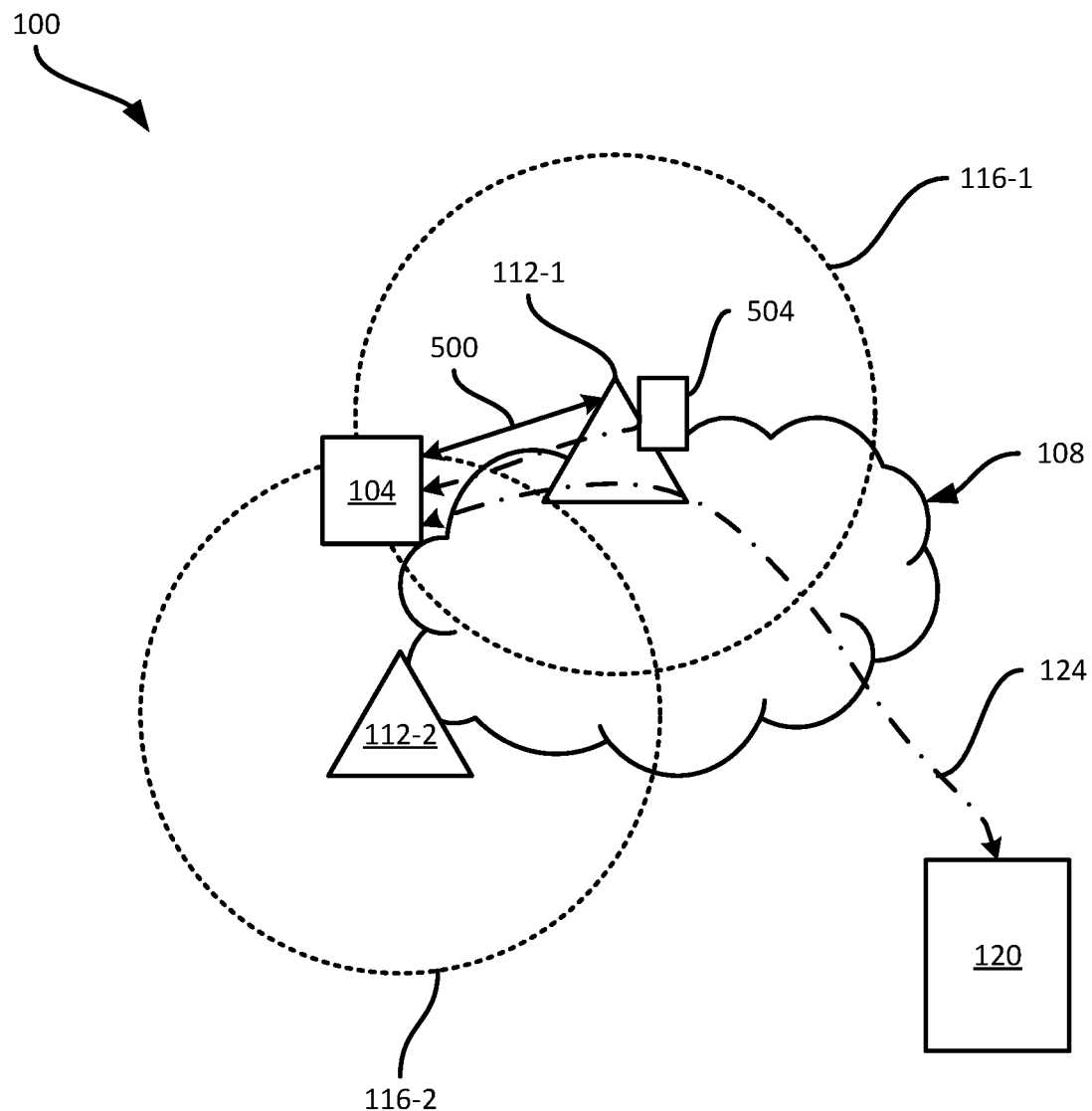
FIG. 6 is a block diagram of the system of FIG. 1 during the performance of block 335 of the method of FIG. 3.

Turning to FIG. 6, an example performance of block 335 is shown. In particular, the link 500 is shown as active (i.e. in solid lines), and data corresponding to the session 124 is transmitted to and from the client device 104 via the access point 112-1. In addition, the contents of the buffer 504 corresponding to the client device 104 is transmitted to the client device 104. As will now be apparent, if the client device 104 initiated the roaming process following the performance of block 320, the buffered data 504 is not retrieved, because the client device 104 roams to the access point 112-2 without reactivating the link 500. For substantially real-time applications such as a VOID call, the loss of the buffered data 504 may degrade call quality. The determination at block 325 and the subsequent performance of block 335 therefore can serve to mitigate such degradation.

Following the performance of block 335 (i.e. in response to retrieval of any buffered data from the access point 112-1), the client device 104 is configured to send a standby indicator at block 340, as discussed above, and to then proceed to block 330. Preferably, the client device 104 is configured to perform block 340 with minimal delay following the completion of receipt of buffered data at block 335.

Figure 7:
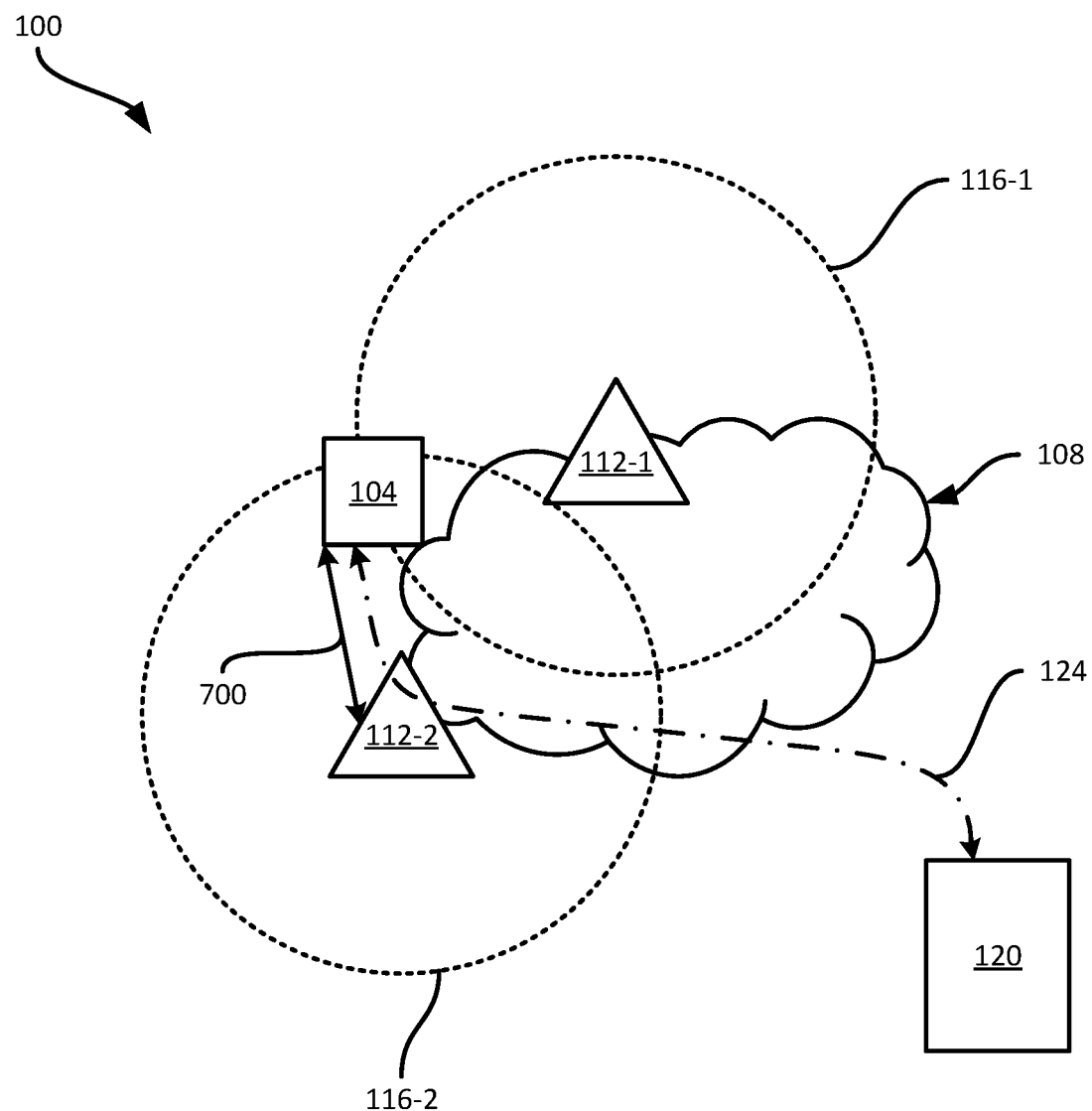
FIG. 7 is a block diagram of the system of FIG. 1 following completion of the performance of the method of FIG. 3.

Turning to FIG. 7, the system 100 is shown following the performance of block 330 (whether arrived at via block 325 or 340). In particular, the client device 104 is connected with the access point 112-2, and the session 124 is therefore continued via the access point 112-2. Any data buffered at the access point 112-1 following the performance of block 340 may be lost. However, the performance of block 335 under certain conditions as described above may serve to limit the volume of such losses, thus mitigating potential performance degradation on the session 124.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method in a client device of mitigating roaming impact on communications, the method comprising:

establishing a communication session at the client device via a first access point;

responsive to determining that a roaming criterion is satisfied, transmitting a standby indicator to the first access point and detecting a second access point;

prior to initiating a roaming process to transfer the communication session from the first access point to the second access point, determining whether a time period elapsed since receipt of a most recent beacon at the client device from the first access point exceeds a beacon threshold; and responsive to determining that the time period exceeds the beacon threshold:
transmitting an active indicator to the first access point;
receiving a further beacon from the first access point; and
responsive to receiving the further beacon, initiating the roaming process to transfer the communication session from the first access point to the second access point.

2. The method of claim 1, wherein the communication session is a real-time communication session.

3. The method of claim 2, wherein the communication session includes a voice over Internet Protocol (VoIP) call.

4. The method of claim 1, wherein determining that the roaming criterion is satisfied includes comparing a signal strength associated with the first access point to a predetermined threshold.

5. The method of claim 1, further comprising:
responsive to receiving the further beacon, and prior to initiating the roaming process, determining whether the further beacon includes an indication that buffered data is available for the client device at the first access point.

6. The method of claim 5, wherein the indication that buffered data is available includes a traffic indication map (TIM).

7. The method of claim 5, further comprising:
when the further beacon includes the indication that buffered data is available for the client device, retrieving the buffered data at the client device prior to initiating the roaming process.

8. The method of claim 1, wherein initiating the roaming process includes:
sending a further standby indicator to the first access point; and
sending an association request to the second access point.

9. The method of claim 1, wherein the standby indicator is a QoS-Null frame containing a first power state flag.

10. The method of claim 9, wherein the active indicator is a QoS-Null frame containing a second power state flag.

11. A client device, comprising:
a communication interface; and
a processor connected to the communication interface, the processor configured to control the communication interface to establish a communication session via a first access point;

the processor further configured, responsive to a determination that a roaming criterion is satisfied, to transmit a standby indicator via the communication interface to the first access point, and to detect a second access point;

the processor further configured, prior to initiation of a roaming process to transfer the communication session from the first access point to the second access point, to determine whether a time period elapsed since receipt of a most recent beacon at the client device from the first access point exceeds a beacon threshold; and the processor further configured, responsive to a determination that the time period exceeds the beacon threshold, to:
transmit an active indicator to the first access point;
receive a further beacon from the first access point; and
responsive to receipt of the further beacon, initiate the roaming process to transfer the communication session from the first access point to the second access point.

12. The method of claim 11, wherein the communication session is a real-time communication session.

13. The method of claim 12, wherein the communication session includes a voice over Internet Protocol (VoIP) call.

14. The client device of claim 11, wherein the processor is further configured, to determine that the roaming criterion is satisfied, to: compare a signal strength associated with the first access point to a predetermined threshold.

15. The client device of claim 14, wherein the indication that buffered data is available includes a traffic indication map (TIM).

16. The client device of claim 14, wherein the processor is further configured, when the further beacon includes the indication that buffered data is available for the client device, to retrieve the buffered data at the client device prior to initiation of the roaming process.

17. The client device of claim 11, wherein the processor is further configured, responsive to receipt of the further beacon, and prior to initiation of the roaming process, to determine whether the further beacon includes an indication that buffered data is available for the client device at the first access point.

18. The client device of claim 11, wherein the processor is configured, to initiate the roaming process, to:
send a further standby indicator to the first access point; and
send an association request to the second access point.

19. The client device of claim 11, wherein the standby indicator is a QoS-Null frame containing a first power state flag.

20. The client device of claim 19, wherein the active indicator is a QoS-Null frame containing a second power state flag.

* * * * *